United States Patent [19]

Dill

[11] 4,241,141
[45] Dec. 23, 1980

[54] REMOVABLE COATINGS WHICH PREVENT PENETRATION FROM FELT TIP MARKING INKS

[75] Inventor: Douglas W. Dill, Racine, Wis.

[73] Assignee: S. C. Johnson & Son, Inc., Racine, Wis.

[21] Appl. No.: 21,748

[22] Filed: Mar. 19, 1979

[51] Int. Cl.$^3$ .............................................. B32B 27/00
[52] U.S. Cl. .................................... 428/500; 427/154; 260/29.6 TA; 260/28.5 R; 260/28.5 AV; 134/4; 134/42; 252/156
[58] Field of Search .................... 134/4; 427/154–156; 260/29.6 TA, 28.5 AV, 28.5 R; 428/500

[56] References Cited

U.S. PATENT DOCUMENTS

| | | | |
|---|---|---|---|
| 2,606,165 | 8/1952 | Chapin | 260/29.6 TA |
| 2,889,299 | 6/1959 | Ritson | 260/29.6 TA |
| 3,467,610 | 9/1969 | Fiarman | 260/29.6 TA |
| 3,503,916 | 3/1970 | Warson | 260/29.6 TA |
| 3,697,466 | 10/1972 | Sullivan | 260/29.6 TA |
| 4,064,092 | 12/1977 | Burroway | 260/29.6 TA |

OTHER PUBLICATIONS

Vandl Guard-ER, SP-546.

*Primary Examiner*—Sam Silverberg

[57] ABSTRACT

A method for protecting painted and other surfaces from being permanently marked by graffiti and particularly markings of flexible tip permanent marking pens comprising coating the surface with a removable composition consisting essentially of from 10 to 35% by weight of a polymer having a monomer content of from 25–70% by weight of a hard monomer, 15–50% by weight of a soft monomer, and 15–30% by weight of an acid monomer, the polymer having been solubilized with sodium hydroxide, potassium hydroxide, or mixtures thereof, from 0–15% of a potassium or sodium salt of a maleic anhydride adduct with a mixed alpha olefin having chain lengths of more than 30 carbon atoms, from 0 to 2% of a coalescing solvent selected from the group consisting of diethylene glycol monoethyl ether, diethylene glycol monobutyl ethyl and mixtures thereof; from 0 to 3% of defoamers, leveling agents, and mixtures thereof; and 90 to 45% by weight water, the composition having an MFT of less than 30° C. and a pH of from 7.0 to 10.0 and allowing the coating to dry on the surface to be protected.

11 Claims, No Drawings

REMOVABLE COATINGS WHICH PREVENT PENETRATION FROM FELT TIP MARKING INKS

BACKGROUND OF THE INVENTION

This invention relates to a method of protecting painted and other surfaces from being permanently marked by flexible tip permanent marking pens and other permanent marking implements. More particularly this invention relates to an improved method using a superior coating composition which prevents the elements in permanent marking pens and other marking implements from penetrating through the protective coating to the surface of the underlying substrate.

The vandalism of buildings, public transportation systems and substantially any vertical surface in the past decade has increased tremendously. The bulk of this vandalism is in the form commonly known as graffiti which is usually applied to the surfaces by spray paint or felt tip permanent marking pens. Graffiti commonly includes names, designs, verbal expressions and the like and must be removed to maintain the appearance of the property. Graffiti is a problem both for interior and exterior surfaces. Interior graffiti, i.e., that applied to the interior walls of schools, buses, public buildings, restrooms, and the like, is primarily applied using flexible tip permanent marking pens. These pens are generally solvent or water based. The solvent based marking pens present the most difficult removal problems. The oil-soluble inks, pigments and dyes used in these marking implements penetrate most barrier materials. Generally, the solvent used in these marking implements creates little problems as the solvent flashes off almost immediately.

One way to counteract the graffiti problem is by developing strong cleaners or combinations of cleaners which can remove substantially any type of marking from almost any surface. While it is possible to clean almost anything from any surface by the right use of materials, permanent marking inks penetrate into painted surfaces. To completely remove the pen marks, all or part of the paint coating must also be removed.

A second approach has been to apply a protective coating onto a surface to protect the same and either prevent the adherence of the graffiti to the surface or act as a sacrificial coating which both prevents the transmission of the graffiti through the coating and is easily removed with the coating by common cleaning methods. Until the development of the composition used in the method of the present invention there has been no successful sacrificial protective coating composition which is capable of prerenting substantially all the markings of various forms of graffiti from penetrating through the sacrificial film to the underlying substrate. While there have been commercial anti-graffiti coatings on the market, each of these coatings is deficient in some way and particularly these coatings are deficient in their resistance to the substances found in permanent flexible tip marking pens.

BRIEF DESCRIPTION OF THE INVENTION

It has been surprisingly found that the use of certain aqueous acrylic polymers when neutralized with sodium hydroxide, potassium hydroxide or mixtures of sodium and potassium hydroxide form effective coating for surfaces and protect the same from various forms of vandalous-type markings including permanent felt tip markers. These compositions cannot contain large quantities of solvent, plasticizer or surfactant. The polymer in aqueous neutralized dispersion must be capable of forming a film at room temperature and accordingly the composition must have an MFT of less than 30° C. and have a pH between 7 and 10. The composition should comprise between 10 and 35% by weight of a polymer which has a monomer content of 25 to 70% by weight of hard monomer, 15 to 50% by weight soft monomer and 15 to 30% by weight of an acid monomer. The balance of the composition should be primarily water.

OBJECTS AND ADVANTAGES

It is a primary object of the present invention to provide a method for protecting a surface from being permanently marked by graffiti.

It is a further object of the present invention to provide a method for protecting surfaces from graffiti which is simple, easy to apply and yet effective.

It is a further object of the present invention to provide a method for utilizing a sacrificial film which acts as a barrier to prevent the penetration of permanent marking elements contained in flexible tip marking inks into the substrate.

It is a still further object of the present invention to provide a method for easily removing graffiti and other markings from walls and other vertical surfaces using mild cleaning solutions.

It is a still further object of the present invention to provide a method for protecting interior surfaces from solvent-based permanent flexible tipped marking implements.

Still further objects and advantages of the method of the present invention will become more apparent from the following more detailed description thereof.

DETAILED DESCRIPTION OF THE INVENTION

The present invention relates to a method for protecting surfaces from being permanently marked by graffiti which comprises coating the surface to be protected with a removable sacrificial coating composition consisting essentially of from 10 to 35% by weight of a polymer having a monomer content of 25 to 70% by weight hard monomer, 15 to 50% by weight soft monomer and 15 to 30% by weight acid monomer, the polymer having been neutralized with sodium hydroxide, potassium hydroxide, or mixtures thereof, from 0 to 15% of a potassium or sodium salt of an adduct of maleic anhydride and a mixed alpha olefin having chain lengths of more than 30 carbon atoms, from 0 to 2% of a coalescing solvent selected from the group consisting of diethylene glycol monoethyl ether, diethylene glycol monobutyl ethyl and mixtures thereof; from 0 to 3% of defoamers, leveling agents, and mixtures thereof; and 90 to 45% by weight of water; the composition having an MFT of less than 30° C. and a pH within the range of from 7.0 to 10.0; and b) allowing the sacrificial coating to dry.

As used in the instant specification and in the attached claims, the term "graffiti" shall refer to any vandalous markings on a surface utilizing a permanent marking device such as flexible tip permanent marking pens and similar marking materials.

When used in the instant specification and claims the term "hard monomer" shall refer to any acrylic or vinyl monomer which produces a homopolymer having a brittle point above 20° C.

When used in the instant specification and claims, the term "soft monomer" shall refer to any acrylic monomer which produces flexible homopolymers having a brittle point below about 20° C.

When used in the instant specification and in the attached claims, the terms "MFT" or "minimum film-forming temperature" shall refer to the minimum temperature at which a composition will form a continuous film. A method for determining MFT is described on pages 64–66 of "Emulsion Polymerization of Acrylic Monomers", #SP-154, published September 1965, by Rohm & Hass Company.

As has been indicated earlier, it is known to utilize acrylic polymers as coatings and particularly as protective coatings. Furthermore, it has been thought that these coatings could have some utility in protecting surfaces from permanent marking created by graffiti. However, it is most surprising to have discovered that only when acrylic polymers are formulated in a certain manner and neutralized with certain bases will a composition which is truly protective of the underlying substrate result. Furthermore, many compositions will provide limited short term protection to substrates from graffiti but upon long term standing and contact with the graffiti the marking elements in the graffiti will leach through the protective substrate and permanently mark or shadow the underlying substrate. The compositions of the present invention substantially eliminate any shadowing or marking of the underlying substrate.

The method of the present invention utilizes as the primary coating agent an acrylic polymer prepared utilizing standard polymerization techniques such as emulsion polymerization, solution polymerization, suspension polymerization, and the like. These polymerization processes are well known in the art and need not be detailed here.

The polymers suitable for use in the method of the present invention must be formulated with a monomer content such that an aqueous neutralized dispersion of this emulsion polymer will produce composition having an MFT of less than 30° C. without the use of large quantities of surfactant or plasticizer. The particular ratio of monomers and the particular monomers used are not particularly critical with the exception that the choice of monomers and the relative amounts of these monomers must be chosen in an amount such that the resulting polymer when neutralized and dispersed in an aqueous system be film-forming at room temperature. These compositions cannot contain substantial amounts of plasticizers or surfactants and accordingly it is preferred that the polymer itself be internally plasticized to form a film at this temperature. Although the polymer should preferably be film forming at room temperatures, the film can not be too soft or a coherent, tough impervious film cannot be formed.

It has been found that polymers having from 25 to 70% and preferably 25 to 60% by weight of the monomers present of a hard monomer are useful in forming the polymers suitable for use in the method of the present invention. Typical hard monomers include lower alkyl methacrylates wherein the lower alkyl group contains 1 to 3 carbon atoms such as methyl methacrylate, ethyl methacrylate and isopropyl methacrylate; cycloalkyl acrylates and methacrylates wherein the cycloalkyl group contains 5 to 7 carbon atoms such as cyclohexyl acrylate, cyclohexyl methacrylate and hard vinyl monomers such as styrene, alpha methylstyrene and acrylonitrile. The preferred hard monomers are styrene and lower alkyl methacrylates particularly methyl methacrylate while the most preferred hard monomer is sytrene.

It has also been found that polymers having from 15 to 50%, preferably 25 to 50%, by weight based on monomers present of soft monomer. Soft monomers which are suitable for use in the composition of the present invention are the alkyl esters of acrylic acid wherein the alkyl group contains from 1 to 12 carbon atoms such as methyl acrylate, ethyl acrylate, butyl acrylate, hexyl acrylate, 2-ethylexyl acrylate and lauryl acrylate and the higher alkyl esters of methacrylate acid wherein the alkyl group contains from 4 to 12 carbon atoms such as butyl methacrylate, 2-ethylhexyl methacrylate and lauryl methacrylate. The preferred soft monomers are ethyl acrylate, butyl acrylate and 2-ethylhexyl methacrylate. The most preferred monomers are ethyl acrylate and butyl acrylate.

The polymers suitable for use in the method of the present invention also must contain from 15 to 30% by weight of an acid monomer. These acid monomers are carboxylic acid monomers having at least one and preferably only one carboxylic acid group. Examples of these monomers include acrylic acid, methacrylic acid, itaconic acid, maleic acid, crotonic acid, the monoalkyl esters of itaconic acid and maleic acid where the alkyl group group contains 1 to 8 carbon atoms such as methyl, ethyl, butyl, hexyl, and octyl. The preferred acid monomers are acrylic and methacrylic acids.

Although molecular weight is not critical, the molecular weight of an acrylic polymer effects the MFT of the composition with lower molecular weights having lower MFT's. It is, therefore, preferred that the acrylic polymers have a weight average molecular weight (Mw) within the range of from 2,000 to 50,000.

The polymers suitable for use in the method of the present invention must be neutralized utilizing alkali metal hydroxides such as sodium hydroxide, potassium hydroxide, and mixtures thereof. Other basic materials have been utilized in the past to neutralize acid-containing acrylic polymers. These materials such as ammonia, triethinol amine and the other amines are not suitable for use in the method of the present invention as identical polymers neutralized with these materials allow the penetrating ingredients or components in graffiti markings to penetrate through the protective coating into the underlying substrate and create shadowing effect. Sodium and potassium salts of acrylic polymers have not been widely used as protective coatings as these basic cations are not fugitive and the resulting film is very water sensitive.

The protective coatings applied by the method of the present invention should contain from 10 to 35% polymer to form a protective film. Preferably from 15 to 25% polymer should be used.

Although large amounts of most common plasticizers, surfactants and solvents are to be avoided, certain controlled amounts of specific plasticizing adducts or solvents can be incorporated into the composition to lower the MFT of resulting composition.

It has been found that from 0 to 15% by weight of a waxy maleic anyldride adduct can be incorporated. These adducts are potassium or sodium salts of a molar adduct of maleic anlydride with a waxy higher alpha olefin mixture having chain length of greater than 30 carbon atoms. In the preferred compositions for use in the method of the present invention, it is preferred that no adduct be present.

Also it is sometimes desirable to incorporate a small amount of a solvent, i.e. 0 to 4% and preferably 0 to 3%, to improve the leveling and film forming properties of the composition. These solvents include the monoethyl and monobutyl ethers of diethylene glycol. If such a solvent is used, the monoethyl ether of diethylene glycol is preferred.

Lastly, it is sometimes necessary to incorporate a small amount of a leveling agent such as fluorocarbon surfactants and phosphates such as tributoxyethyl phosphate and a small amount of an antifoam agent into the composition used in the method of the present invention. The combined amounts of these materials when present should not exceed 3% by weight.

Although as noted above small amounts of plasticizers can be used, large quantities of these materials are to be avoided as this allows migration of components of the marking inks to penetrate the sacrificial coating.

The balance of the composition useful in the method of the present invention is water. The water generally will be present in amounts of from 90 to 45% by weight and preferably 90 to 60% by weight and most preferably from 90 to 65% by weight.

The application of the sacrificial coating step of the present method can be carried out using any suitable application technique including brushing, wiping, rolling or spraying. The coating is then allowed to dry or cure until it is dry to the touch. The drying step generally requires from about 10 to about 30 minutes although shorter dry time may be possible if the surface is heated to drive off the water. Shortly after the compositions have thoroughly dried, they can be subjected to graffiti without the danger of the graffiti penetrating through the sacrificial coating to the protected underlying substrate.

The method of the present invention will now be illustrated by way of the following examples which are for the purpose of illustration only and are in no way as to be considered limiting. In the following examples all parts and percentages are by weight and all temperatures and degrees Celcius unless otherwise indicated.

EXAMPLE 1

An alkali-soluble resin was prepared by solution polymerization and had a monomer content of 15% styrene, 40% alphamethyl styrene, 25% butyl acrylate and 20% acrylic acid. The solvent was stripped off using a resin flaker. The resin was solubized with both ammonium hydroxide and potassium hydroxide to give a 20% nonvolatile resin cut having a pH of 8.1. 0.02% of a fluorocarbon surfactant Zonyl FSJ was added to improve leveling as was 1.2% ethyl ester of diethylene glycol solvent. Both compositions were applied to baked urethane-coated metal panels. The following day the panels were marked with a red "El Marko" pen from Flair and a black "MARKette" pen from Eberhard Faber. The barrier coats were stripped from the paint with an ammoniated cleaner at 2 hours after marking and at 2 weeks after marking. The potassium cut removed all the ink both after 2 hours aging and 2 weeks aging while the ammonium cut removed all the red ink after 2 hours aging and 20% of the black ink after 2 hours aging. No ink was removed from the ammonia cut area after 2 weeks aging.

EXAMPLE 2 AND COMPARATIVE EXAMPLES 1–3

An emulsion polymer "A" having a monomer content of 35% styrene, 40% butyl acrylate and 25% methacrylic acid was prepared using 1.5% of ammonium persulfate as an initiator and 2.0% of butyl mercapto propronic acid as a chainstopper. This polymer was prepared without surfactant. A similar emulsion polymer "B" was prepared using 3% sodium lauryl sulfate. Both polymers are film formers at room temperature. The polymers are solublized with potassium hydroxide or diethylaminoethanol as shown in Table I to pH 7.5. These polymers were reduced to 20% nonvolatiles with water and were applied to enameled metal panels and allowed to dry. Ink marks using a black "MARKette" pen were applied at various intervals as shown in Table I. The panels were aged 24 hours after the last marking and stripped with an ammoniated cleaner. The panels were inspected for ink removal.

TABLE I

| | Polymer | Base | Ink Applied X Hours After Drying | | | | |
| | | | 1 | 4 | 20 | 48 | 96 |
|---|---|---|---|---|---|---|---|
| Example 2 | A | KOH | All[2] | All | All | All | All |
| CE 1 | B | KOH | Shadow[3] | Shadow | Shadow | Shadow | Shadow |
| CE 2 | A | DEAE[1] | Stain[4] | Stain | Stain | Stain | Shadow |
| CE 3 | B | DEAE[1] | Stain | Stain | Stain | Stain | Stain |

[1]DEAE - Diethylaminoethanol
[2]All - All ink removed
[3]Shadow - Most of the ink removed but perceptible, faint discoloration of paint film
[4]Stain - Obvious black or green mark on paint film This shows that large quantities of surfactant in the coating destroys the protective ability of the composition. Also that amines are not satisfactory solublizers for the present method.

EXAMPLE 3

The polymer "A" from Example 2 was neutralized with potassium hydroxide to pH 8. Some 0.02% of zonyl FSJ was added to improve leveling. Half of the potassium cut was reduced to 20% non-volatiles with water while the other half was reduced with water and monoethyl ether of diethylene glycol to give 20% polymer, 4.5% ethyl ether of diethylene glycol and 75.5% water. These coatings were applied to baked urethane-coated enamel metal plates and tested as in Example 1. The cut made with water removed all the ink marks while the cut with water and the solvent removed 100% of the red mark after 2 hours, 80% of the black mark after 2 hours, 98% of the red mark after 2 weeks and 30% of the black mark after 2 weeks.

This shows that relatively large amounts of solvent lessens the protective nature of the coatings used in the present invention.

EXAMPLES 4 and 5 and COMPARATIVE EXAMPLES 4-6

A relatively hard resin "C" made by solution polymerization having a monomer content of 31% styrene, 37% alpha methyl styrene and 32% acrylic acid is plasticized using a molar adduct of maleic anhydride with a mixed alpha olefin (MAAAO) having chain lengths of greater than 30, available from Gulf chemicals as WAMAX 37. The adduct and resin are mixed as shown in Table II and neutralized to pH 8 with potassium hydroxide. Each of the coatings are applied to painted metal panels along with three commercially available antigraffiti coatings. Each coating was allowed to dry for 3 days before being marked with black "MAR-Kette" permanent ink. After aging for 1 month the panels were stripped with alkaline cleaner. The results are shown in Table II.

TABLE II

|  | Resin C | MAAAO | Water | Vandl-Guard[1] | NYCTA[2] | SCJ #129[3] | Ink Removal |
|---|---|---|---|---|---|---|---|
| Example 4 | 10 | 8 | 82 | — | — | — | All[4] |
| Example 5 | 11 | 7 | 82 | — | — | — | All |
| CE 4 | — | — | — | 100 | — | — | None[5] |
| CE 5 | — | — | — | — | 100 | — | None |
| CE 6 | — | — | — | — | — | 100% | Stain[6] |

[1] Vandl-Guard - Sold by Rain Guard Products Co. of Los Angeles
[2] NYCTA - Wax coating, Interior, Stripable to specification of New York City Transit Authority. NYCTA-1137-C-78-June 27, 1978
[3] SCJ #129 - An acrylic and wax coating sold by S. C. Johnson & Son, Inc., Racine, WI
[4] All - All marks removed
[5] None - No marks removed
[6] Stain - Obvious black or green mark in paint

EXAMPLES 6-8
COMPARATIVE EXAMPLES 7-10

A series of emulsion polymers as shown in Table III are prepared. These polymers are similar to polymer "A" of EXAMPLE 2, except that the monomer content has been varied. The polymers are solublized with either ammonium hydroxide or potassium hydroxide as noted in Table III. Each composition is film forming and has 20% non-volatiles. The coatings are applied to painted panels and air dried for 24 hours. Four different marking pens were used.

TABLE III

| | Base | Sty[1] | BA[2] | MAA[3] | Ink Removal |
|---|---|---|---|---|---|
| Example 6 | KOH | 35 | 40 | 25 | Complete |
| Example 7 | KOH | 40 | 40 | 20 | Complete |
| Example 8 | KOH | 45 | 40 | 15 | Slight Shadow from Black |
| CE 7 | KOH | 50 | 40 | 10 | Black & Red Stain |
| CE 8 | NH4OH | 40 | 40 | 20 | Severe Black & Red Stain |
| CE 9 | NH4OH | 45 | 40 | 15 | Severe Black & Red Stain |
| CE 10 | NH4OH | 50 | 40 | 10 | Severe Stain-All 4 colors |

[1] Sty - Styrene
[2] BA - Butyl acrylate
[3] MAA - Methacrylic acid

This shows the criticality of the acid level of the polymers used in the method of the present invention.

EXAMPLE 9

Example 2 is repeated except the polymer has a monomer content of 35% methyl methacrylate, 40% butyl acrylate and 25% methacrylic acid. The potassium cuts of this polymer gave complete removal of marking inks while an ammonia cut did not.

EXAMPLE 10

Example 2 is repeated except the polymer has a monomer content of 35% styrene, 40% 2-ethyl hexyl acrylate and 25% methacrylic acid. The potassium cut showed complete removal of black and faint shadowing with red ink while the ammonia cuts gave no protection.

EXAMPLE 11

Example 2 was repeated except that the base used as solublizer is sodium hydroxide. The level of sodium hydroxide was varied to give pH's as shown in Table IV. As comparison runs, ammonium hydroxide and a 1 to 1 mixture of ammonia hydroxide and sodium hydroxide are given. The panels were coated and marked with "MARKette" black ink and aged 20 days, then stripped.

TABLE IV

| Run | Base | pH | Ink Removal |
|---|---|---|---|
| A | NaOH | 7.0 | Complete |
| B | NaOH | 8.0 | Complete |
| C | NaOH | 9.1 | Complete |
| D | NaOH | 9.7 | Complete |
| Comp A | NH4OH | 8.0 | Severe Staining |
| Comp B | 50%NaOH/50%NH4OH | 8.4 | Severe Staining |

EXAMPLE 12

A series of protective coatings were prepared using the components set forth in Table V. These compositions were applied to enameled surfaces and marked at 2 hours and 1 day after coating. The coatings were stripped after the contact time shown in Table V.

TABLE V

| Run | Polymer A[1] | MAAAO[2] | KP-140[3] | FSJ[4] | 104E[5] | Water | Brush App. | Leveling | Gloss | 2Hrs. | 24Hrs. | Ink Removal |
|---|---|---|---|---|---|---|---|---|---|---|---|---|
| A | 18 | 4.5 | 1.0 | 0.02 | 0.5 | 75.98 | OK | Exc. | High | All | All | All |
| B | 18 | 4.5 | 0.5 | 0.00 | 0.0 | 77.0 | Foamy | Good | High | All | All | All |
| C | 18 | 4.5 | 0.5 | 0.02 | 0.5 | 76.48 | OK | Exc. | High | All | All | All |

TABLE V-continued

| Run | Polymer A[1] | MAAAO[2] | KP-140[3] | FSJ[4] | 104E[5] | Water | Brush App. | Leveling | Gloss | 2Hrs. | 24Hrs. | Ink Removal |
|---|---|---|---|---|---|---|---|---|---|---|---|---|
| D | 18 | 4.5 | 0.5 | 0.00 | 1.00 | 76.0 | OK | Good | High | All | All | Shadow |
| E | 18 | 4.5 | 0.0 | 0.04 | 0.50 | 76.96 | OK | Fair | High | All | All | All |

[1] Polymer A - Example 2
[2] MAAAO - Gulf WAMAX 37
[3] KP-140 - tributoxyethylphosphate
[4] FSJ - Zonyl FSJ - duPont
[5] 104E - 50% Tetramethyl decynediol in ethylene glycol This shows the effects of small amounts of leveling agents and anti-foam agents. At 1.00 of 104E, the protection of the coating is deteriorating.

I claim:

1. A method of protecting surfaces from being permanently marked by graffiti comprising:
   (a) Coating the surface to be protected with a removable barrier composition consisting essentially of;
   (i) from 10 to 35% by weight of a polymer having a monomer content of from 25 to 70% by weight hard monomer, from 15 to 50% by weight of a soft monomer and from 15 to 30% by weight of an acid monomer, the polymer having been solublized with sodium hydroxide, potassium hydroxide or mixtures thereof;
   (ii) from 0 to 15% of a plasticizer selected from the group consisting of the sodium salt of a maleic anlydride adduct with a mixed alpha olefin having chain lengths of more than 30 carbon atoms, the potassium salt of a maleic anlydride adduct with a mixed alpha olefin having chain lengths of more than 30 carbon atoms and mixtures thereof;
   (iii) from 0 to 2% of a coalescing solvent selected from the group consisting of diethylene glycol monoethyl ether, diethylene glycol monobutyl ether and mixtures thereof;
   (iv) from 0 to 3% of defoamers, leveling agents and mixtures thereof; and
   (v) from 90 to 45% by weight water, the composition having an MFT of less than 30° C. and a pH of from 7.0 to 10.0; and
   (b) Allowing the coating to dry on the surface to be protected.

2. The method of claim 1 wherein the polymer is an emulsion polymer.

3. The method of claim 1 wherein the polymer has a monomer content of 25 to 60% hard monomer; 25 to 50% soft monomer and 15 to 30% acid monomer.

4. The method of claim 1 wherein the polymer has a Mw of from 2,000 to 50,000.

5. The method of claims 1 or 3 wherein the polymer is solublized using potassium hydroxide.

6. A method of protecting surfaces from being permanently marked by griffiti comprising:
   (a) Coating the surface to be protected with a removable barrier coating consisting essentially of:
   (i) from 10 to 35% by weight of a polymer having a monomer content of 25 to 60% hard monomer, 25 to 50% soft monomer and 15 to 30% acid monomer, the polymer having been solublized with sodium hydroxide, potassium hydroxide or mixtures thereof;
   (ii) from 0 to 2% of a coalescing solvent selected from diethylene glycol monoethyl ether, diethylene glycol monobutyl ether and mixtures thereof;
   (iii) from 0 to 3% of defoamers, leveling agents, plasticizers and mixtures thereof; and
   (iv) from 90 to 60% water, the composition having an MFT of less than 30° C. and a pH of from 7.0 to 10.0; and
   (b) Allowing the coating to dry on the surface to be protected.

7. The method of claim 6 wherein the polymer is present in an amount of from 15 to 25% by weight and the water is present in an amount of from 90 to 65% by weight.

8. The method of claim 6 wherein the polymer has a Mw of from 2,000 to 50,000.

9. The method of claim 6 wherein the polymer is solublized using potassium hydroxide.

10. The method of claim 6 wherein the polymer has a monomer content of 20 to 60% hard monomer; 25 to 50% soft monomer and 15 to 30% acid monomer.

11. The method of claim 6 wherein the polymer is an emulsion polymer.

* * * * *